UNITED STATES PATENT OFFICE.

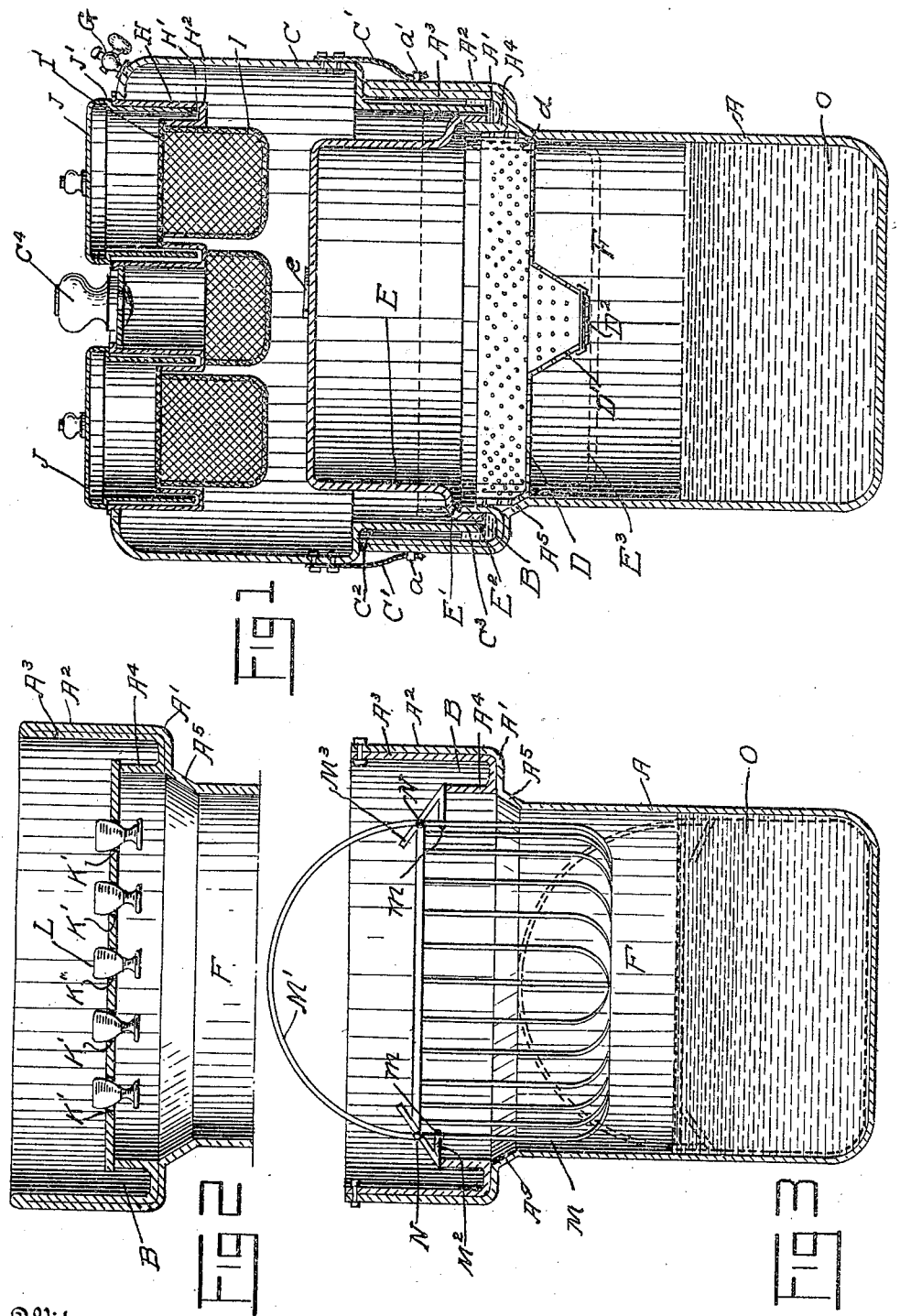

ALBERT W. MEYER, OF ROSELLE, NEW JERSEY.

STEAM-COOKER.

952,572.
Specification of Letters Patent.
Patented Mar. 22, 1910.

Application filed January 16, 1908. Serial No. 411,135.

*To all whom it may concern:*

Be it known that I, ALBERT W. MEYER, a citizen of the United States, residing at Roselle, New Jersey, have invented certain new and useful Improvements in Steam-Cookers, of which the following is a specification.

My invention relates to cooking utensils, and the object of same is to provide a utensil of this character which may be used as a steam cooker and also provide for cooking by submerging the food in the water therein, and also having provision whereby both methods may be employed at the same time.

A further object is to provide a device in which a part of the utensil may be inverted and thus made to serve two or more functions, and in general, to provide a handy utensil for restaurant use of compact and durable construction.

The features of novelty will be specifically pointed out in the claims herewith presented.

Referring to the drawings which form a part of this specification,—Figure 1, is a vertical sectional view of my improved utensil. Fig. 2, is a similar view of a portion of the utensil disclosing a disk shaped member provided with openings in which egg cups are supported. Fig. 3, is a sectional view of the base portion of the utensil, disclosing a wire pail supported therein above the water level.

A, indicates a vessel which may be of any desired form in cross section, but is preferably formed circular as shown, and is provided with a laterally extending flange $A'$ and a top portion $A^2$ of larger diameter than the lower portion of the vessel.

Resting in the top portion $A^2$ and supported by the flange $A'$, is an element $A^3$, which closely fits within the top portion $A^2$, thus reinforcing the outer wall $A^2$, and said element $A^3$ is provided with an upwardly extending flange $A^4$, thus forming an annular chamber or groove B, which serves as a water sealing chamber in which the lower edge of the cover C rests.

The top edge of the element $A^4$, is located below the middle of the portion $A^2$, and this construction permits of a deep water seal being used, since the entire depth of the portion $A^2$ may be utilized to effect this result.

The vessel A is formed with a conical portion $A^5$, the top of which is in line with the inner wall of the portion $A^4$, which construction permits a strainer receptacle D to slide between in contact with said wall and rest on said conical portion, the outer lower edge of said receptacle D having a similar conical form, as indicated at $d$. The receptacle D is provided with a central conical depression $D'$, at the bottom of which is an opening which is spanned by a wire $D^2$, by means of which the said receptacle may be held when inserting or removing same from the vessel A, since the wire may be readily grasped by the fingers or lifted with a hook.

Resting on the top edge of the portion $A^4$ is a pan E, provided with a laterally extending flange $E'$, and having a lower projecting portion $E^2$, which rests in the water sealing chamber B, as shown, the flange $E'$ resting on the upper edge of the portion $A^4$, and in this position serving as a cover for the chamber F. A ring $e$, is hinged to the top of the pan E, by means of which the pan may be lifted. The pan E is designed to be used as such when inverted, the top portion as now presented being illustrated in dotted lines indicated by $E^3$, and being supported by the flange $E'$, as will be readily understood.

The vessel A is provided with two projecting lugs $a$ and $a'$ respectively, located on opposite sides from each other, over which the spring clasps $C'$ pass to hold the cover C to the vessel A. The cover C is reduced in diameter at its lower end, thus forming a flange $C^2$, which rests on the top of the vessel A, and the lower depending portion $C^3$ extends almost to the bottom of the sealing chamber B. The top of the cover is provided with a knob $C^4$ for lifting the same, and a vent cock G to liberate steam from the vessel. Supported from the top of the cover C are a number of receptacles of like construction, each comprising a depending wall H, the lower end of which is spun inward and upward to form an annular water chamber $H'$, and supported from the upper edge of the portion $H^2$, is a wire basket I, provided with a flanged top $I'$, which rests on said upper edge and is separable therefrom. A cover J is provided with a flanged portion $J'$, which rests on the top of the cover C, and its lower end extends within the water sealing chamber $H'$. The wire baskets may be provided with a bail, by which they may be lifted from the cover C.

Referring to Fig. 2, K indicates a disk having openings K', of slightly less diameter than that of an individual egg cup, and L indicates an egg cup resting in one of said openings. A number of disks may be kept on hand provided with openings of different diameters to serve various purposes in the line of cooking, and one may be kept without any opening, to serve as a cover when resting on the top edge of the portion $A^4$, either for the chamber F or the pan E when in its inverted position.

Referring to Fig. 3, M, indicates a wire pail provided with a bail M', and having two swinging brackets $M^2$ and $M^3$ respectively, located on opposite sides thereof and pivoted at N, and the lower inner ends $m$ of same are bent at a right angle to cause them to abut against the inner side of the wire body to prevent the brackets from swinging outward beyond the position indicated in the drawing when the elbows thereof rest on the top edge of the portion $A^4$ and thereby support said basket in the position shown. The basket M is of slightly less diameter than the inner diameter of the vessel A, and may be lowered therein to the position indicated by the dotted lines, by swinging the brackets $M^2$ and $M^3$ parallel with the sides of the basket to prevent them from projecting beyond the outer surface of the basket, as will be easily understood. O, indicates water in vessel A, from which steam is generated.

By the design and construction of the above co-acting portions, I am able to utilize the hot water, and steam generated therefrom, to cook simultaneously cabbage or potatoes in the wire basket M, eggs in one of the baskets I, and at the same time be steaming or warming some other food in the steamer receptacle D, and in case a customer orders boiled eggs at one moment and a second order is received two minutes later, they may be immediately placed in a second basket I, without waiting for those first started cooking to finish. The cone shaped portion D' of the strainer receptacle serves to hold a bowl or bowls of varying diameters. Plates may be placed on the top of the pan E to keep food thereon warm. A regular pail may be supported in the cover C in place of the wire pails I for some purposes, but the wire baskets have been found of exceptionable utility for cooking eggs.

By removing the strainer receptacle D, and inverting the pan E, I may boil two different vegetables simultaneously, one in the vessel A and one in the pan E, and since the strainer receptacle D will then rest on the flange E' of the pan E, when thus inverted, I may utilize this vessel at the same time as a steamer, and also be using the baskets I for cooking eggs, etc. By this arrangement I am able to save space in the kitchen, time in preparing food, fuel in cooking same, and use less stove space to do a given amount of cooking, as will be readily understood.

Having thus described my invention, what I claim as new and desire to secure by Letters Patent, is—

1. A utensil of the character described comprising a vessel having a cover, said cover having an opening in its top, a depending wall having an upturned lower edge forming a chamber, a perforated receptacle supported from the upper edge of said chamber, and a cover for said top opening the lower edge of which rests in said chamber.

2. A utensil of the character described, comprising a vessel having a cover, said cover having an opening in its top, a depending wall having an upturned lower edge forming a chamber, a receptacle supported from said upturned edge, and a cover for same, the lower edge of which rests in said chamber.

3. A utensil of the character described, comprising a vessel having a laterally extending flange, and a chamber formed directly above said flange adapted to hold a sealing fluid, a cover having a flanged portion which rests on the top of said vessel and the lower edge of which rests in said chamber to form a seal, said cover having an opening in its top, a depending wall having an upturned lower edge forming a chamber, a perforated receptacle supported from said upturned edge, and a cover for same, the lower edge of which rests in said chamber.

4. A utensil of the character described, comprising a vessel having a laterally extending flange, and a chamber formed directly above said flange adapted to hold a sealing fluid, a cover having a flanged portion which rests on the top of said vessel and the lower edge of which rests in said chamber to form a seal, said cover having an opening in its top, a depending wall having an upturned lower edge forming a chamber, a receptacle supported from said chamber, and a cover for the top opening having a depending wall, the lower edge of which rests in said chamber.

5. A utensil of the character described, comprising a vessel having a laterally extending flange and a chamber formed directly above said flange and adapted to hold a sealing fluid, a cover having a flanged portion which rests on the top of said vessel and having a depending wall the lower edge of which rests in said chamber to form a seal, said cover having an opening in its top, a depending wall having an upturned lower edge forming a chamber, a receptacle supported by said upturned edge, a cover for same having a depending wall the lower edge of which rests in said chamber; and means for detachably connecting the first named vessel and the cover therefor.

In testimony whereof, I have signed my name to this specification in the presence of two subscribing witnesses, this twenty third day of December 1907.

ALBERT W. MEYER.

Witnesses:
    FRANK M. ASHLEY,
    VIRGINIA ZEIS.